(12) United States Patent
Rolls (10) Patent No.: US 11,097,144 B2
(45) Date of Patent: Aug. 24, 2021

(54) PET LEASH ASSEMBLY

(71) Applicant: Lisa Rolls, Fenton, MI (US)

(72) Inventor: Lisa Rolls, Fenton, MI (US)

( * ) Notice: Subject to any disclaimer, the term of this patent is extended or adjusted under 35 U.S.C. 154(b) by 693 days.

(21) Appl. No.: 15/144,156

(22) Filed: May 2, 2016

(65) Prior Publication Data
US 2016/0317855 A1 Nov. 3, 2016

Related U.S. Application Data

(60) Provisional application No. 62/155,697, filed on May 1, 2015.

(51) Int. Cl.
| | | |
|---|---|---|
| *A63B 21/06* | (2006.01) | |
| *A01K 27/00* | (2006.01) | |
| *A63B 21/075* | (2006.01) | |
| *A63B 21/072* | (2006.01) | |
| *A63B 71/06* | (2006.01) | |
| *A63B 21/055* | (2006.01) | |

(52) U.S. Cl.
CPC ........ *A63B 21/0603* (2013.01); *A01K 27/004* (2013.01); *A01K 27/006* (2013.01); *A01K 27/008* (2013.01); *A63B 21/072* (2013.01); *A63B 21/075* (2013.01); *A63B 21/0552* (2013.01); *A63B 21/0557* (2013.01); *A63B 2071/0694* (2013.01); *A63B 2209/08* (2013.01); *A63B 2209/10* (2013.01); *A63B 2225/055* (2013.01); *A63B 2225/74* (2020.08)

(58) Field of Classification Search
CPC .. A01K 27/004; A01K 27/008; A01K 27/006; A01K 27/003; A01K 27/00; A63B 21/0601; A63B 21/072; A63B 21/075; A63B 21/0724; A63B 2071/0694
USPC ................ 119/796, 797, 794, 792, 795, 770
See application file for complete search history.

(56) References Cited

U.S. PATENT DOCUMENTS

| 6,314,917 B1 * | 11/2001 | Ryan .................... A01K 27/004 |
| | | 119/796 |
| 8,839,745 B1 * | 9/2014 | Johnston .............. A01K 27/003 |
| | | 119/769 |
| 2006/0219188 A1 * | 10/2006 | Beaupre ............... A01K 27/006 |
| | | 119/795 |
| 2009/0093348 A1 * | 4/2009 | Wang ................. A63B 21/0603 |
| | | 482/93 |

(Continued)

*Primary Examiner* — Peter M Poon
*Assistant Examiner* — Jeffrey R Larsen
(74) *Attorney, Agent, or Firm* — Dickinson Wright PLLC; Steven Hurles (57) ABSTRACT

The leash assembly includes a leash mechanism with a body, a cord, a clip and a handle that extends from the body. The body presents two spaced apart circular sides with outer peripheral edges. The cord extends from an interior of the body between the circular sides to a free end. The clip is attached with the free end of the cord for attaching the cord with the collar of the animal. The leash assembly further includes a cover with first and second portions which at least partially cover the circular sides of the body of the leash mechanism. The first and second portions of the cover has outer peripheries which generally follow at least a portion of each of the outer peripheral edges of the generally circular sides of the body. The cover contains a high density material for increasing a mass of the leash assembly.

6 Claims, 8 Drawing Sheets

(56) References Cited

U.S. PATENT DOCUMENTS

| | | | |
|---|---|---|---|
| 2010/0048363 A1* | 2/2010 | Gilberti | A63B 21/0603 |
| | | | 482/105 |
| 2015/0208614 A1* | 7/2015 | Vaccari | A01K 27/006 |
| | | | 119/796 |
| 2016/0143253 A1* | 5/2016 | Pawlowski | A01K 27/004 |
| | | | 119/796 |

* cited by examiner

PET LEASH ASSEMBLY

CROSS REFERENCE TO RELATED APPLICATION

This application claims the benefit of U.S. provisional patent application Ser. No. 62/155,697 filed May 1, 2015, the contents of which are herein incorporated by reference.

BACKGROUND OF THE INVENTION

1. Field of the Invention

The present invention relates generally to pet leashes for attachment to animal collars.

2. Related Art

Dog owners typically take their dogs out routine walks as a means of bonding with their dogs and exercising both themselves and their dogs. While helpful, the health benefits from walking a dog are generally limited to a person's cardiovascular system since. That is, typical dog walking with a general leash offers little strength training and muscle building benefits.

One product that is available for allowing a dog owner to build arm strength while walking his or her dog is known as the "Dog Walker's Dumbbells"™. One product that has been developed for pet owners to do arm exercises while walking their animal is referred to as the "Dog Walker's Dumbbells". This product includes a retractable leash assembly with a dumbbell incorporated into the handle of the leash assembly that accommodates the attachment of various weights to vary the total weight carried. One drawback to the "Dog Walker's Dumbbells" is the fact that it requires the user to buy an entire new assembly, even if he or she already had a dog leash. Another drawback is that, at first glance, this product clearly looks like exercise equipment. As such, some people might be fine using it to do arm exercises when walking through the woods but are embarrassed to use it around others. The fear of exercising in public and of being seen in public with exercise equipment has been recently and informally called "gymtimidation".

SUMMARY OF THE INVENTION AND ADVANTAGES

One aspect of the present invention is related to a leash assembly for attachment to a collar worn by an animal. The leash assembly includes a leash mechanism with a body, a cord, a clip and a handle. The body presents two circular sides with outer peripheral edges, and the sides are disposed in spaced and parallel relationship with one another. The cord extends from an interior of the body between the circular sides to a free end. The clip is attached with the free end of the cord for attaching the cord with the collar of the animal. The handle extends from the body for holding the leash assembly by a pet walker. The leash assembly further includes a cover with first and second portions which at least partially cover the circular sides of the body of the leash mechanism. The first and second portions of the cover has outer peripheries which generally follow at least a portion of each of the outer peripheral edges of the generally circular sides of the body. The cover contains a high density material for increasing a mass of the leash assembly.

The fact that the cover with the weighted material follows the peripheral edges of the sides of the body of the leash mechanism makes the leash assembly more indiscrete than other weighted leash assemblies. As such, a pet owner can more confidently take the leash assembly into public without advertising to the world that he or she is carrying around a piece of exercise equipment. Additionally, the cover can be joined with different types of leash mechanisms, and thus, the pet owner can simply purchase the cover and attach it with the leash mechanism he or she already owns rather than having to purchase an entire new leash assembly as is the case for other known weighted leash assemblies. The leash assembly allows the pet walker to, when he or she feels comfortable, perform weight training exercises while walking his or her pet. Such weight training has been found to help people increase strength, increase their range of motion of their arms and reduce muscular deterioration which naturally occurs through aging.

According to another aspect of the present invention, the cover includes at least two pieces of fabric which are joined together with the high density material being enclosed within the joined pieces of fabric.

According to yet another aspect of the present invention, the cover includes a plurality of bands and at least one strap which extend between the first and second portions of the joined pieces of fabric for holding the cover onto the body of the leash mechanism.

According to still another aspect of the present invention, the high density material of the cover is iron sand.

According to a further aspect of the present invention, the iron sand is disposed in a plurality of containers between the joined pieces of fabric.

According to yet a further aspect of the present invention, the at least two pieces of fabric are made of neoprene or a neoprene-like material.

According to still another aspect of the present invention, the cover further includes piping that is made of a different material than the at least two pieces of fabric, and the material of the piping has a higher reflectivity than the material of the pieces of fabric.

According to another aspect of the present invention, the bands are of an elastic material.

According to yet another aspect of the present invention, the strap includes a hoop and hook attachment means.

According to still another aspect of the present invention, the cord extends between an area of the joined pieces of fabric between the first and second portions and one of the bands.

According to a further aspect of the present invention, the leash assembly also includes a flashlight, and one of the bands releasably captures the flashlight.

According to yet a further aspect of the present invention, the first and second portions of the cover are a pair of disks.

According to still a further aspect of the present invention, the disks are generally circular in shape.

According to another aspect of the present invention, the pair of disks is a first pair of disks each having a first weight and further including a second pair of disks having a second weight that is different than the first weight, and the cover is interchangeable between the pair of first disks and the pair of second disks.

According to yet another aspect of the present invention, the cover further includes a reflective material which is disposed on an exposed surface of at least one of the disks.

According to still another aspect of the present invention, the cover further includes a decorative covering which is disposed on an exposed surface of at least one of the disks.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
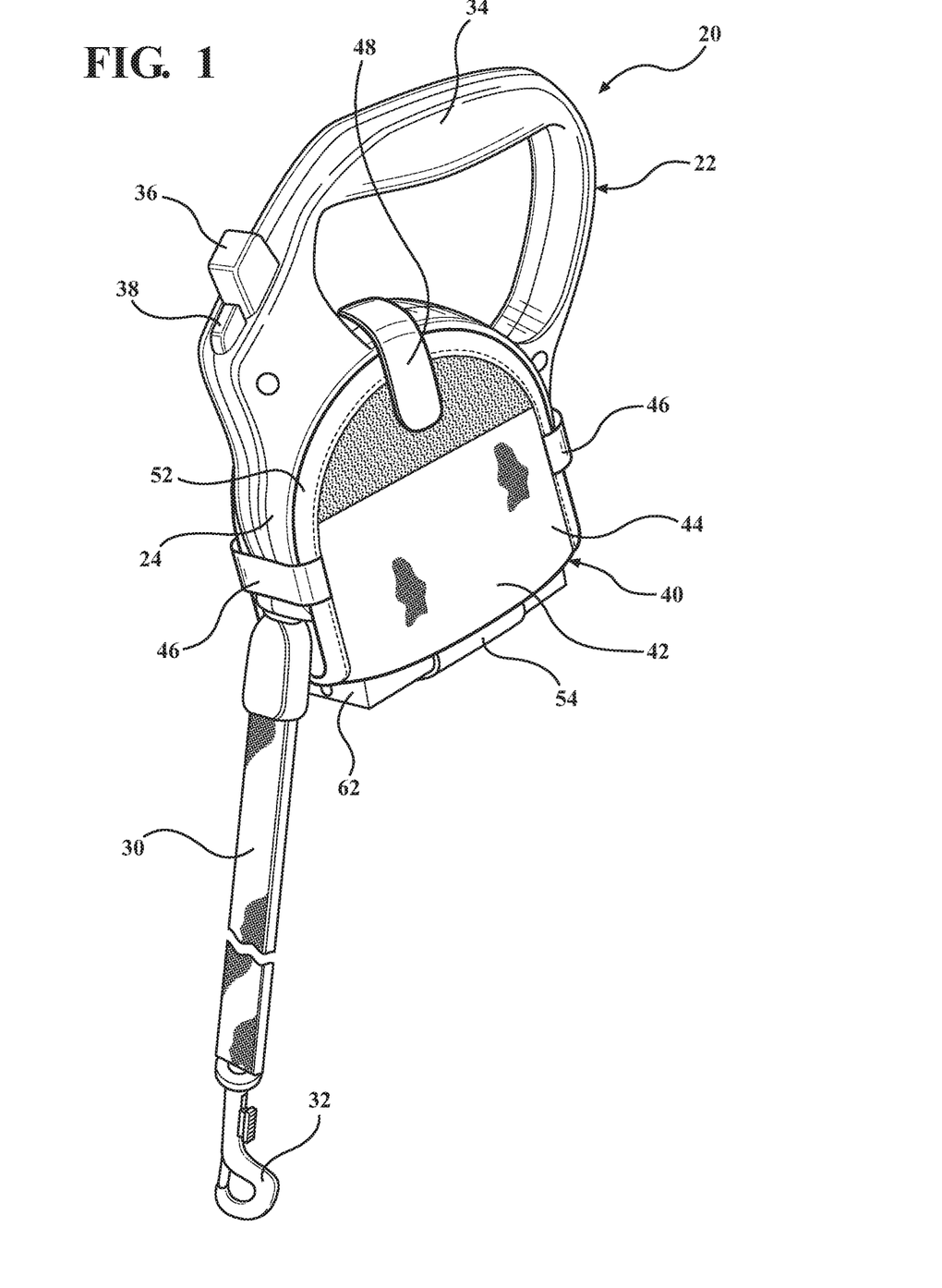
FIG. 1 is a perspective view of a first exemplary embodiment of a leash assembly constructed according to one aspect of the present invention.

Referring to the Figures, wherein like numerals indicate corresponding parts throughout the several views, a first exemplary embodiment of a leash assembly 20 for attachment to a collar worn by an animal, such as a pet dog or a pet cat, is generally shown in FIG. 1. It should be appreciated that any attachment means, such as a harness, vest, chain, or choker could be used in place of the collar on the animal. The leash assembly 20 allows a pet walker to control his or her pet while taking the pet for a walk.

The leash assembly 20 includes a leash mechanism 22 which with a body 24 which is made as two clamshell halves which present sides 26 that are generally circular in shape and have respective peripheral edges 28. The two halves are joined together along the respective peripheral edges 28 such that the sides 26 are disposed in spaced and parallel relationship with one another and bound a hollow interior, which contains a cord 30 and a windup mechanism (not shown) for selectively allowing the cord 30 to be pulled out of the open interior of the body 24 and retracting the cord 30 back into the interior of the body 24. The cord 30 extends to a free end with a clip 32 affixed thereto for attaching the cord 30 with a collar of the animal.

A handle 34 extends from the body 22 to enable a person to grip the leash mechanism 22 and maintain control of the animal attached to the clip 32 at the free end of the cord 28. A brake button 36 extends from the body 24 adjacent the handle 34 and is movable between an engaged position with the brake button 36 operatively connected to the windup mechanism for preventing the cord 30 from extending from or retracting into the open interior of the body 24, and a disengaged position allowing the cord 30 to freely extend from or retract into the open interior. A latch lever 38 is located adjacent the brake button 36 for selectively holding the brake button 36 in the engaged position.

The leash assembly 20 further includes a cover 40 which receives the latch mechanism 22 and is weighted to allow the pet walker to perform strength training exercises while walking his or her pet. The cover 40 includes a pair of fabric pieces 42 which are joined together along their outer peripheries. In the exemplary embodiment, the outer peripheries of the fabric pieces 42 are sewn together. However, it should be appreciated that the fabric pieces 42 could alternately be joined together with adhesives or through any suitable means. The fabric pieces 42 are made of an elastic and flexible material, such as, neoprene.

The outer periphery of the joined fabric pieces 42 extends along a length between first and second portions 44 with rounded ends. The joined together fabric pieces 42 are folded, and the first and second portions 44 are connected together with a pair of elastic bands 46 such that the cover 40 is generally pocket shaped with an interior that is defined on two sides and a bottom by the fabric pieces 42 and on two other sides by the elastic bands 46.

The leash mechanism 22 is received within the pocket-shaped interior of the cover 40 such that the first and second portions 44 of the cover 40 at least partially cover the sides 26 of the body of the leash mechanism 22. As shown, when the leash mechanism 22 is received in the interior of the cover 40, the outer periphery of the joined fabric pieces 42 generally follow portions of the circular outer peripheral edges of the sides 26 of the body 24 of the latch mechanism 22. This generally disguises the cover 40 such that it is not readily apparent to a passerby. The cover 40 does not restrict the ability of the cord 30 to be pulled out of and be retracted back into the open interior of the body 24 of the leash mechanism 22 because the cord 30 extends between a middle area of the joined fabric pieces 42 and one of the elastic bands 46.

A strap 48 extends between the rounded ends of the first and second portions 44 and between the body 24 and the handle 34 of the leash mechanism 22 to releasably lock the cover 40 onto the leash mechanism 22. The strap 48 of the exemplary embodiment is of Velcro, but any suitable type of retaining strap or belt that is capable of locking and unlocking may be employed.

Figure 2:
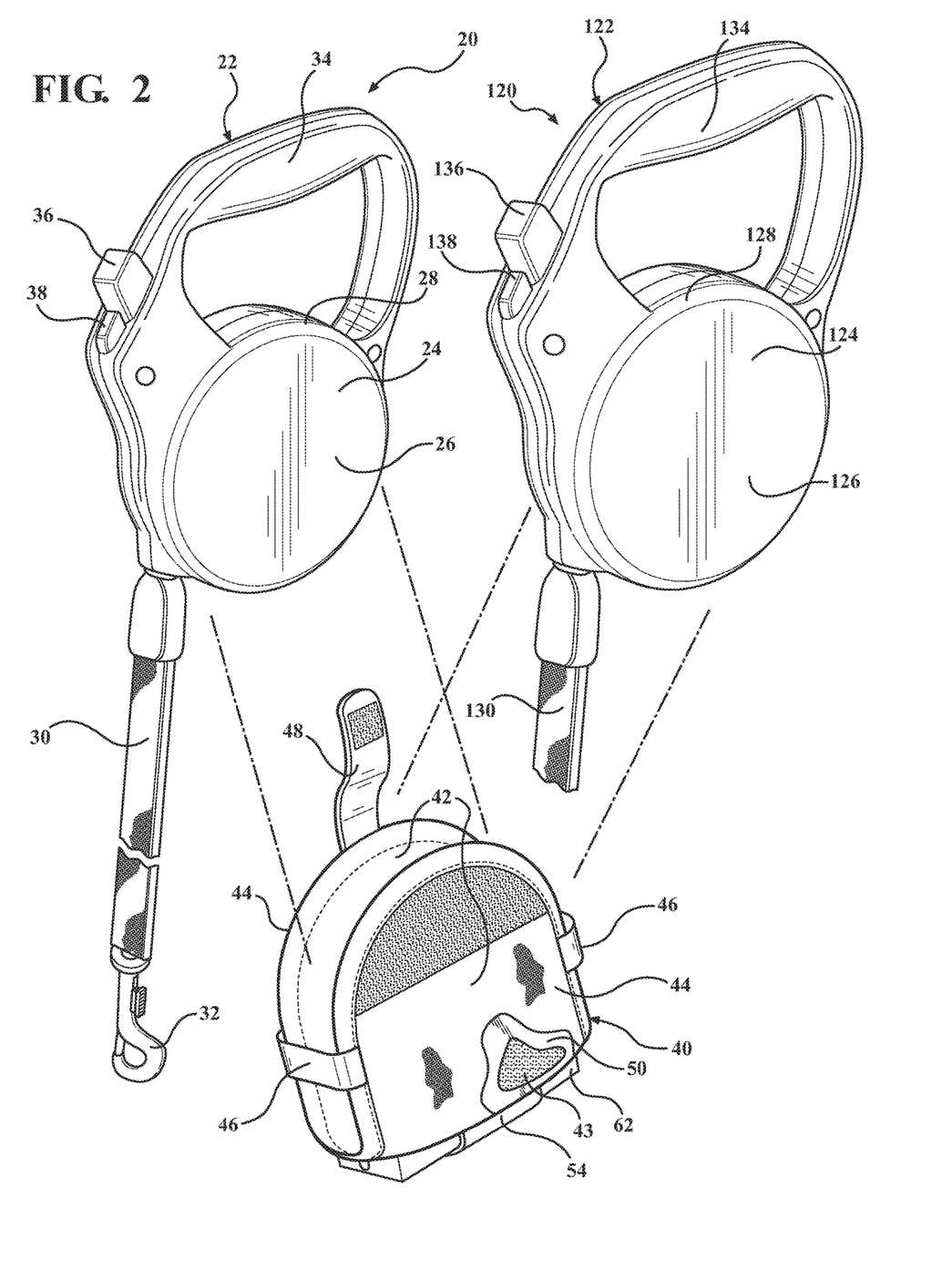
FIG. 2 is an exploded view of the leash assembly of FIG. 1 and illustrating the ability to leash mechanisms of different sizes with the same cover.

As shown in FIG. 2, the elasticity of the elastic bands 46 and the flexibility of the strap 48 allow the cover 40 to be joined with leash mechanisms 22, 122 of different sizes, wherein like numerals, separated by a prefix of "1" indicate corresponding parts in the larger leash mechanism 122 with the smaller leash mechanism 22. This allows for manufacturing cost savings through economies of scale and reduces customer confusion because a potential customer does not have to figure out which cover 40 will fit his or her leash mechanism 22, 122.

The cover 40 also includes a weighted, or high density, material which is disposed between the fabric pieces 42 for increasing the mass of the cover 40 and the leash assembly 20. In the exemplary embodiment, the weighted material is iron sand 43 which is contained within a plurality of pouches 50 that are made of a plastic material. This configuration allows for cost effective manufacturing, and the iron sand 43 is soft to cushion any blow if the pet owner accidentally drops the leash assembly 20 on his or her feet or pet. The fabric pieces 42 may include one or more openings for allowing the pouches of iron sand 43 to be inserted into or removed from the cover 40 to allow the pet owner to adjust the weight of the leash assembly 20. The iron sand 43 is generally evenly distributed between the first and second portions 44 of the cover 40 such that the leash assembly 20 is generally evenly balanced.

The exemplary embodiment of the cover 40 also includes piping 52 which extends along the peripheral edge of the joined fabric pieces 42. The piping 52 may be made of a different and highly reflective material for increasing the pet walker's visibility in low light conditions.

The cover 40 further includes an additional elastic band 54 in the area of the joined fabric pieces 42 between the first and second portions 44. The leash assembly 20 further includes a flashlight 62 which can be trapped between the joined fabric pieces 42 and the additional elastic band 54. As such, the leash assembly 20 doubles as a flashlight so the pet owner does not have to hold a separate flashlight with his or her other hand. The elasticity of the additional elastic band 54 also allows for the flashlight 62 to be quickly and easily detached from the cover 40.

The combination of the portions 44 of the cover 40 following the peripheral edges 28 of the sides 26 of the leash mechanism 22 and the weighted material of the cover 40 allows a pet walker to confidently carry the leash assembly 20 in public without it being readily apparent that he or she is carrying a piece of exercise equipment. When he or she feels comfortable to exercise, the mass of the cover 40 allows the pet walker to perform strength training exercises, which have been found to improve health by increasing strength, increasing range of motion and slowing muscular deterioration through aging.

Referring now to FIGS. 5-8, an alternate embodiment of the leash assembly 120 is generally shown. In the second embodiment, the cover 140 includes a plurality of disks 56 with opposing circular faces. The disks 56 are preferably provided in matching pairs with each matching pair 56a, 56b, 56c (see FIG. 7) having a different weight. In the exemplary embodiment, the disks 56 are made of metal. However, it should be appreciated that the weighted disks 56, 57 may be made of any suitable material and through any suitable process. For example, the weighted disks 56, 57 could be injection molded out of a high density plastic material.

Figure 5:
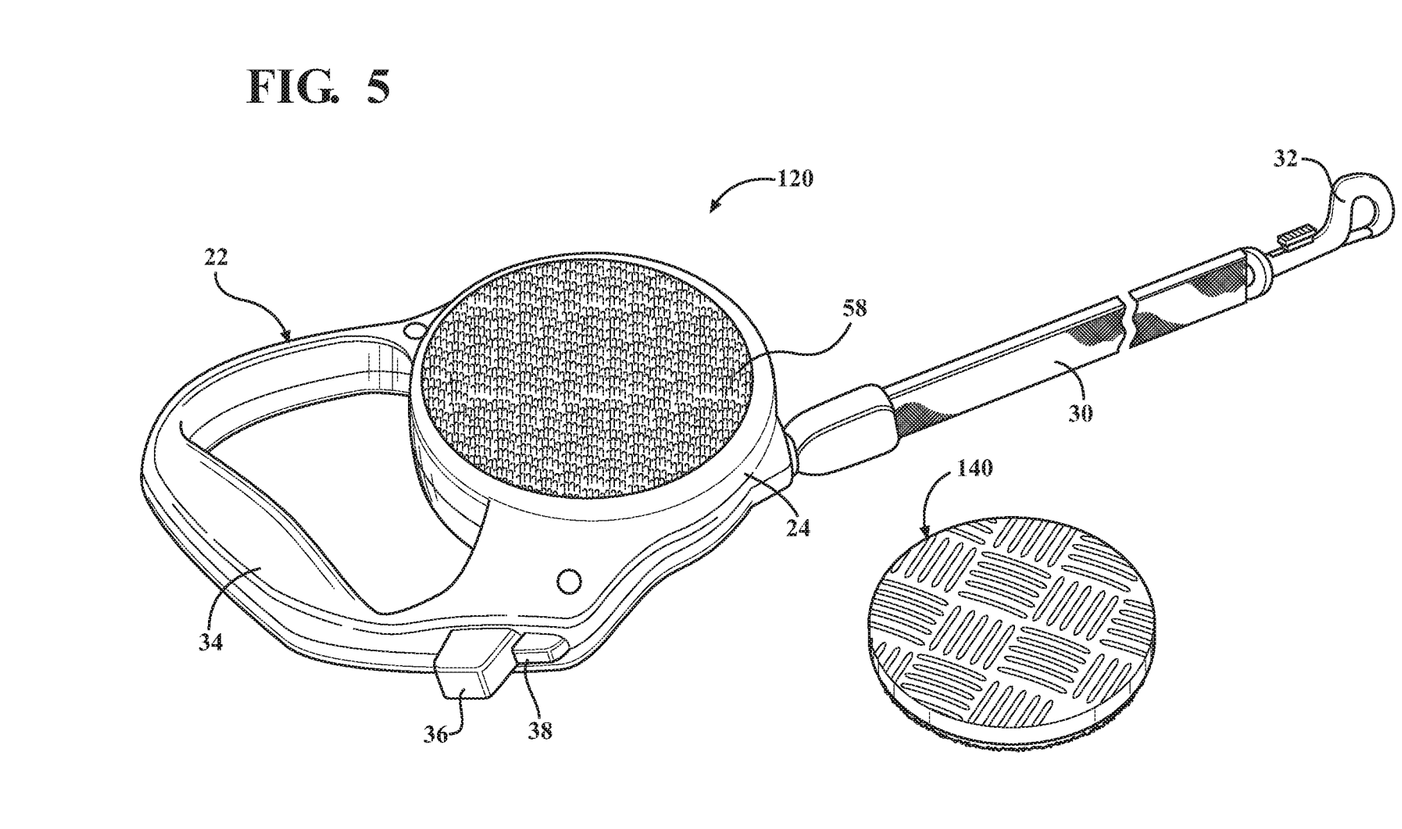
FIG. 5 is a perspective and exploded view of a second exemplary embodiment of the leash assembly.
Figure 6:
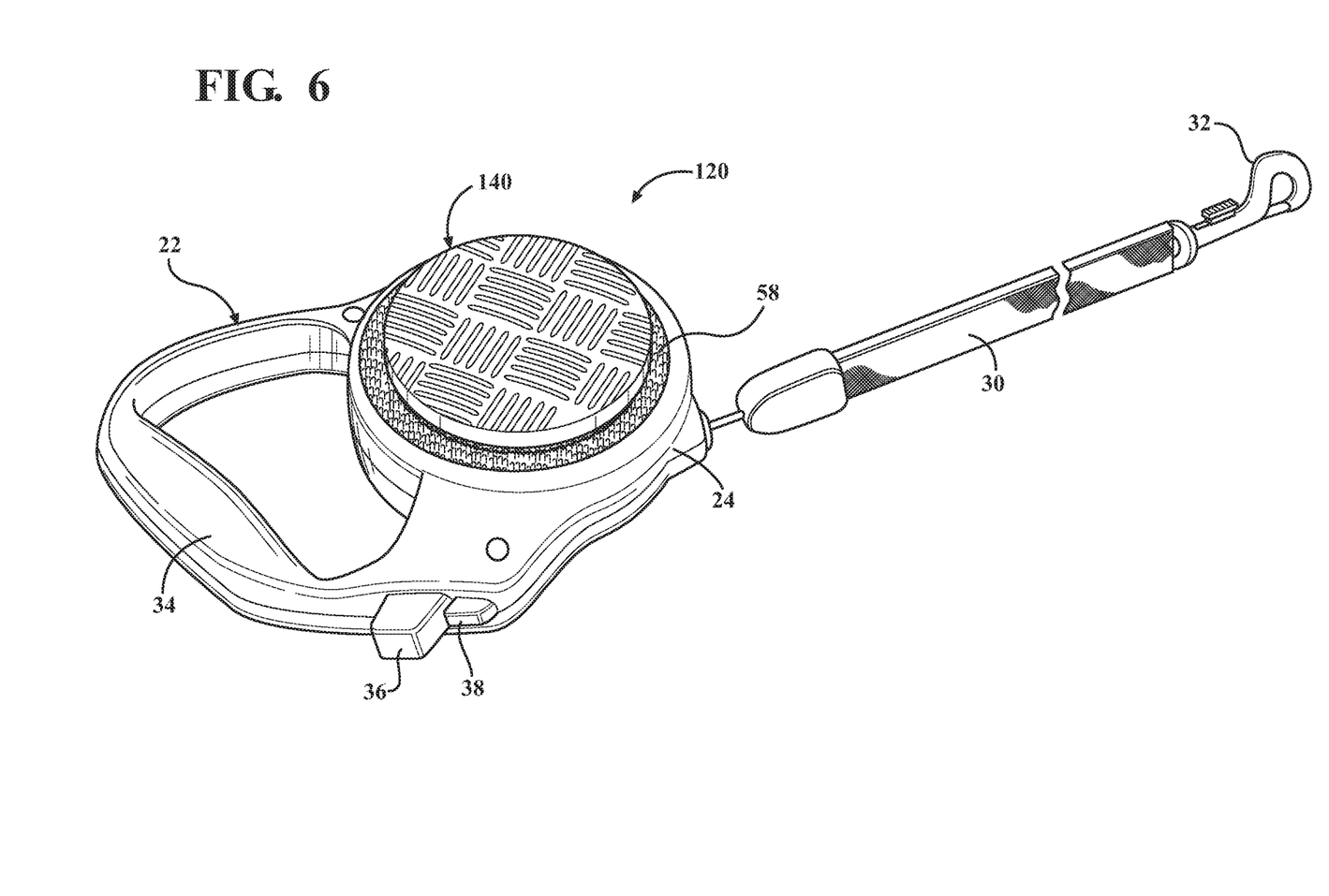
FIG. 6 is a perspective and elevation view of the second exemplary embodiment of the leash assembly.
Figure 7:
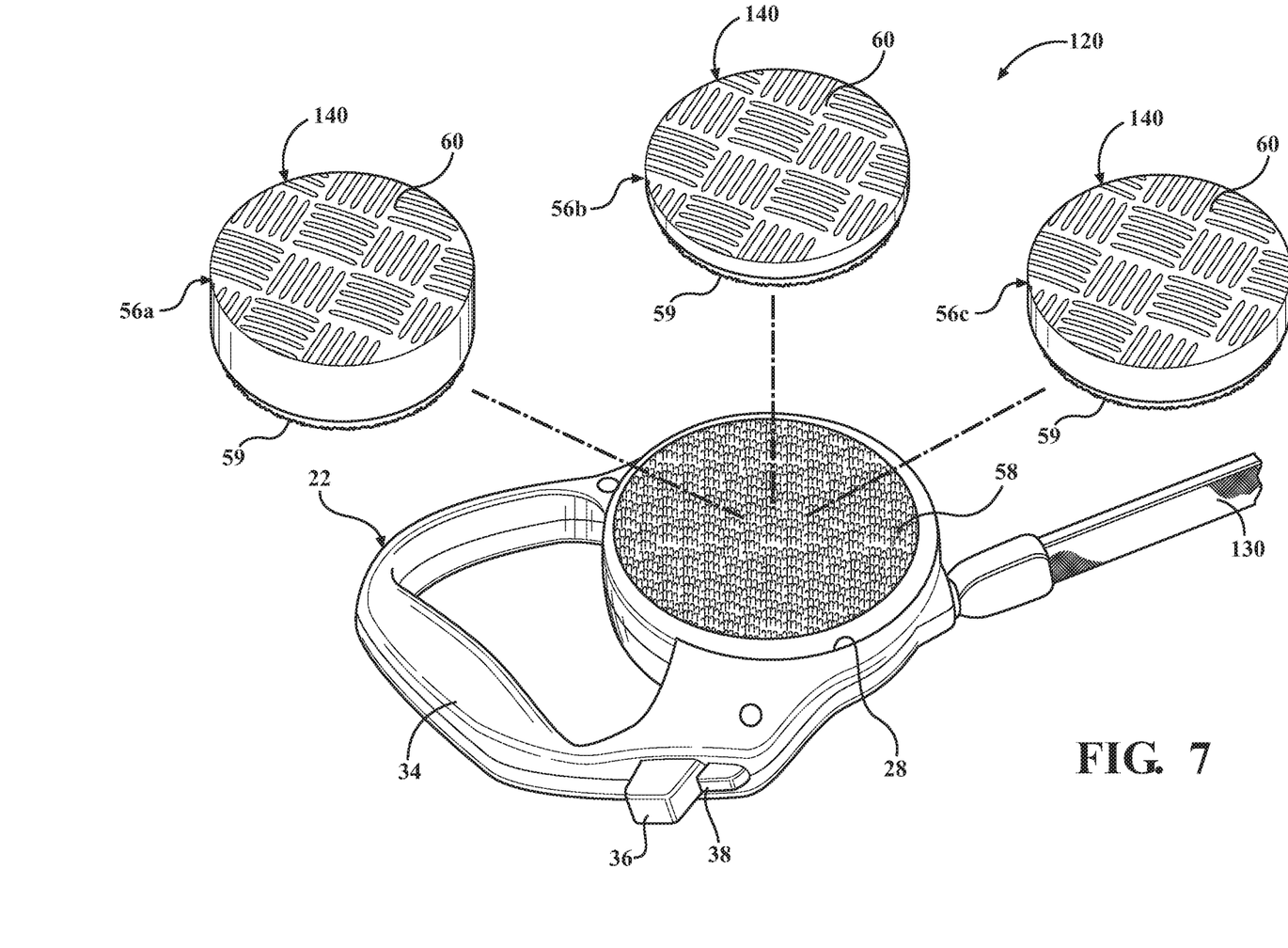
FIG. 7 is a perspective and exploded view of the second exemplary embodiment of the leash assembly and showing differently sized disks.
Figure 8:
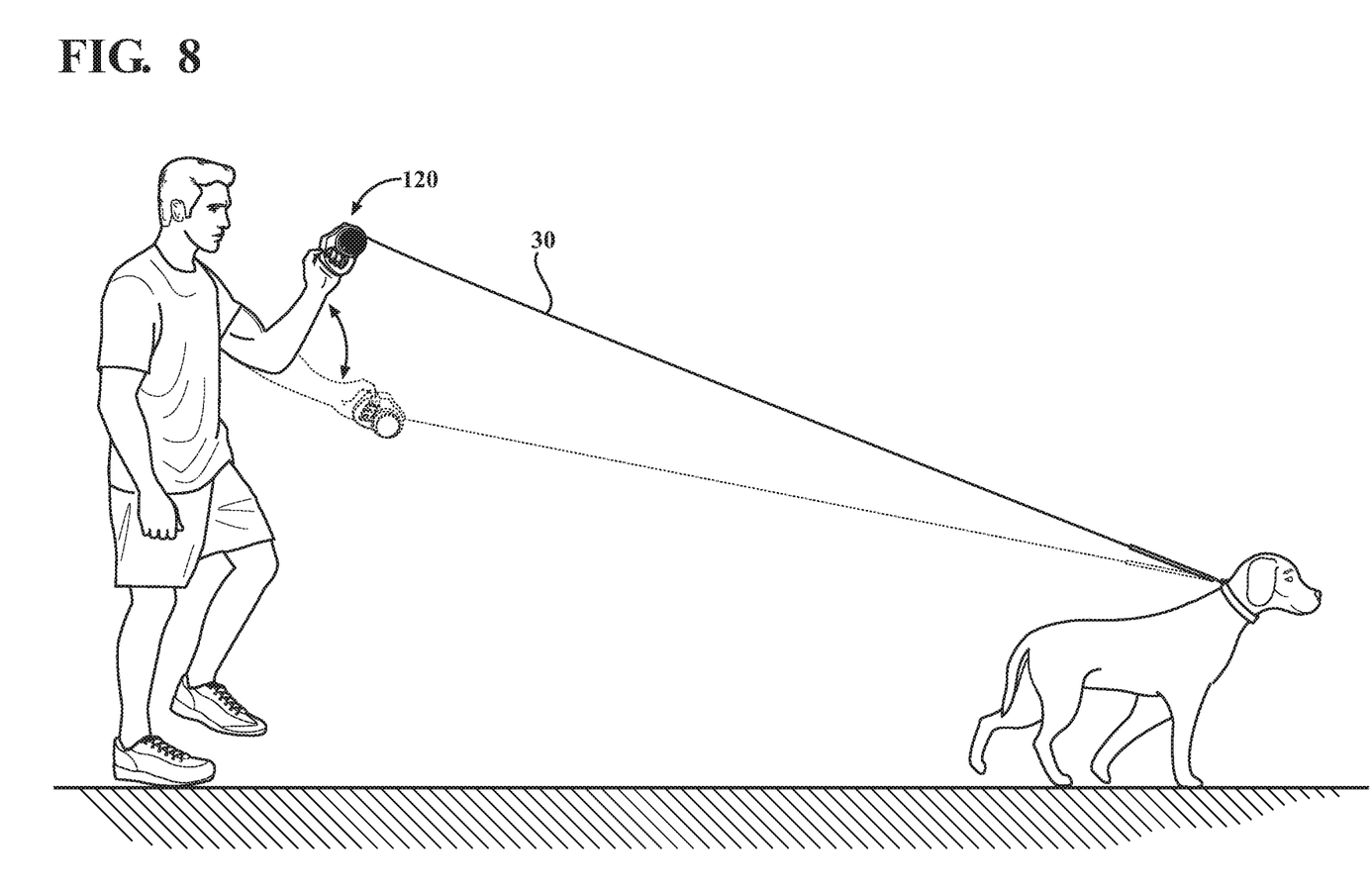
FIG. 8 is a side view showing a person using the second exemplary embodiment of the leash assembly.

The disks 56 of the cover 140 are attached with the body 24 of the leash mechanism 22 via a coupling 58, 59 which includes a hook-and-loop type fastener that is commonly known under its trade name "Velcro®". More specifically, the exemplary coupling 58, 59 includes a first sheet 58 of hooks attached to each of the sides 26 of the body 24 and a second sheet 59 of loops attached to a first face of each of the disks 56, 57. The first and second sheets 58, 59 may be releasably joined together such that the outer peripheries of the disks 56, 57 generally follow the outer peripheries of the sides 26 of the body 24 to increase the mass and weight carried by the pet walker. The pet walker may adjust the weight of the leash assembly 20 by attaching a different pairs of the disks 56a, 56b, 56c to the body 24 because the different pairs of disks 56a, 56b, 56c have different masses. Because, when attached with the leash mechanism 22, the disks 56 do not extend beyond the peripheral edge of the body 24, to an ordinary observer, the leash assembly 120 with the disks 56 attached to the leash mechanism 22 is not noticeably different than the leash mechanism 22 on its own. As a result, the pet walker may carry around a device for strength training without it being apparent to a casual observer that he or she is doing so. The coupling 58, 59 may also comprise any suitable connection means for releasably attaching the disks 56 with the leash mechanism 22, including but not limited to magnets, pockets, adhesives, zippers, latches, clips, snaps, pins, studs, nuts and bolts, screws, suction cups, etc., or any combination thereof.

A second face of each of the disks 56 presents an exposed surface which is opposite the second sheet 59 of the coupling 58, 59. A reflective and/or decorative material 60 is disposed on the exposed surfaces of the disks 56. If a decorative material 60 is employed, it could include any desirable pattern, a logo or any desirable indicia.

Figure 3:
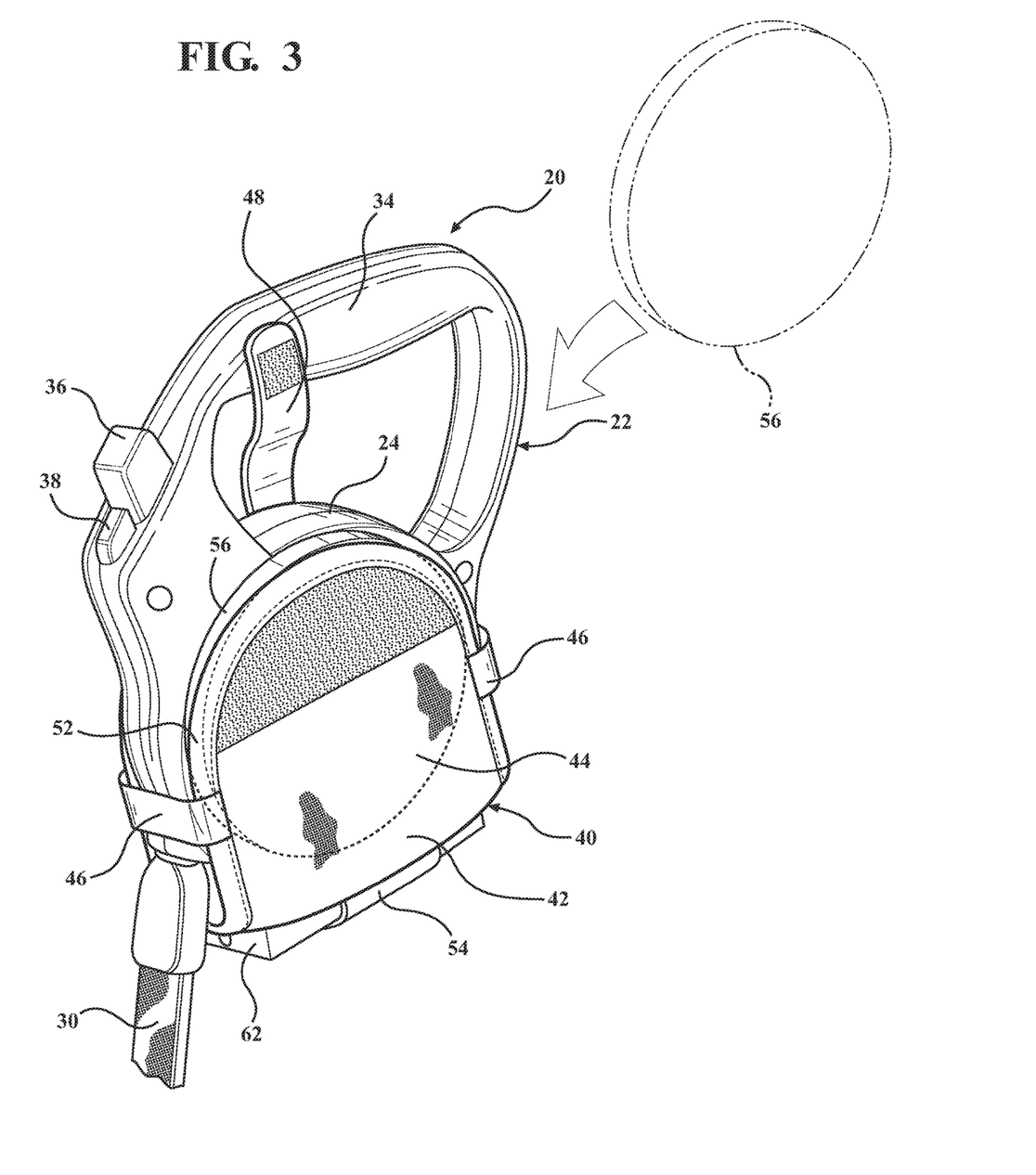
FIG. 3 is another perspective view showing the leash assembly of FIG. 1 and with a weighted disk inserted between the cover and the leash mechanism.
Figure 4:
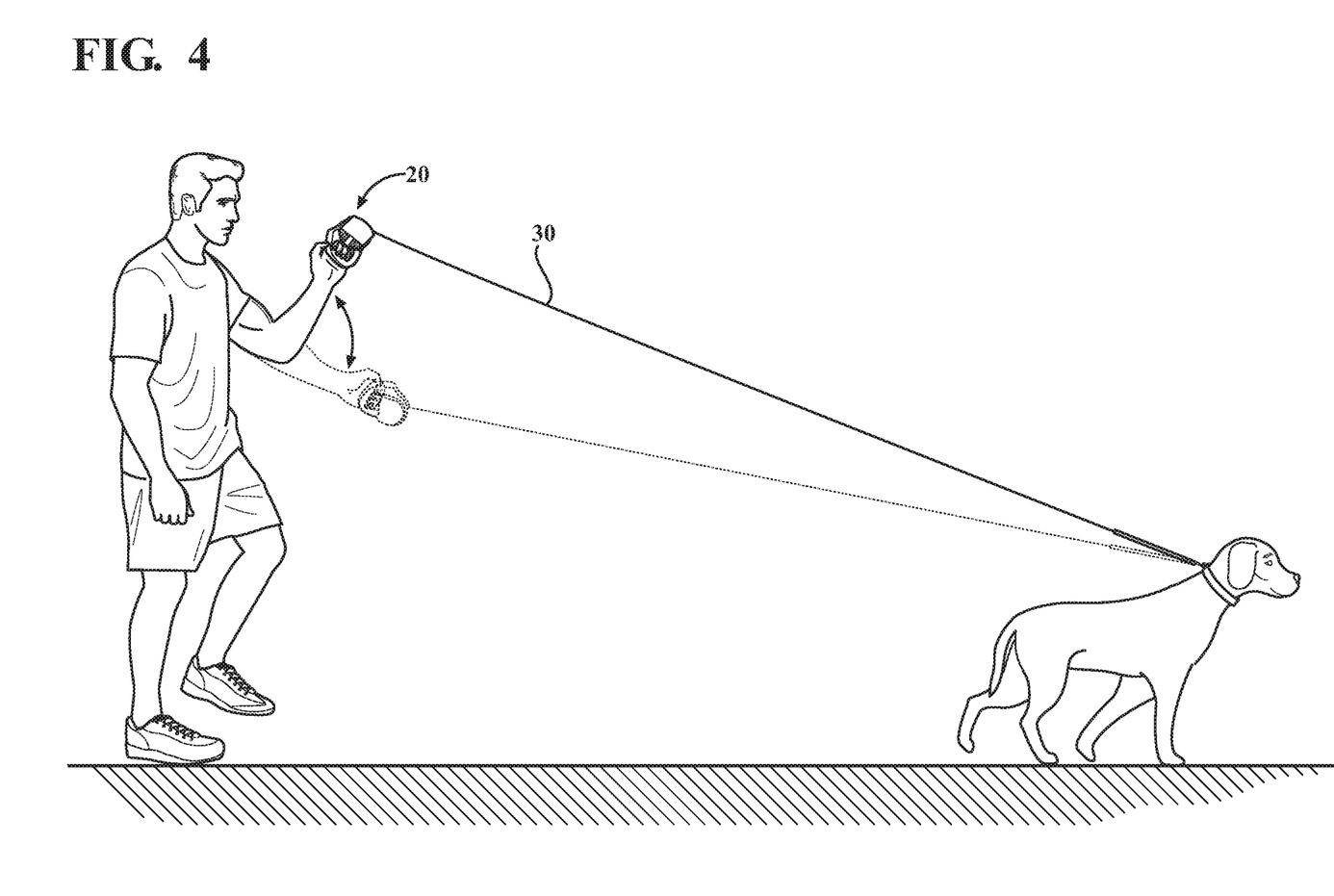
FIG. 4 is a side view showing a person using the first exemplary embodiment of the leash assembly.

As shown in FIG. 3, the elasticity of the bands 46 of the first exemplary embodiment of the cover 40 also allows a disk 56 to be inserted between the pieces of fabric 42 and the leash mechanism 22 to further increase the weight of the leash assembly 20.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A leash assembly attachable to a collar worn by an animal for use by an individual when walking the animal, said leash assembly comprising:

a leash mechanism including a body defining an interior and having a handle extending from said body to define an opening between said body and said handle, a cord disposed in said interior and retractably extending from said interior through said body to a clip attachable to the collar of the animal, said body presenting a pair of sides disposed in spaced and parallel relationship with one another on opposite sides of said interior and each of said sides having a generally circular shape and a first outer peripheral edge, a cover being made of a material which is folded to present first and second side portions and a bottom, said first and second side portions directly contacting and fully said sides of said body, said cover having a bottom which extends between said first and second side portions, each of said first and second side portions having a curved second outer peripheral edge which has a same radius of curvature as an adjacent one of said first outer peripheral edges of said body of said leash mechanism and wherein each of said curved second outer peripheral edges overlies and follows the adjacent one of said first outer peripheral edges of said body, said cover including at least one strap that extends past said curved second outer peripheral edge of said first side portion to engage said second side portion of said cover and said at least one strap extending between said body and said handle of said leash mechanism and securing said cover to said leash mechanism, said cover containing a high density material for increasing a mass of said leash assembly, said cover including at least two pieces of fabric which are joined together to form a pocket which contains said high density material, said high density material being iron sand, said iron sand being disposed in a plurality of containers between said pieces of fabric, and said fabric pieces include at least one opening for allowing the containers of iron sand to be inserted into or removed from said cover.

2. The leash assembly as set forth in claim 1 wherein said at least two pieces of fabric are made of neoprene.

3. The leash assembly as set forth in claim 1 wherein said cover further includes piping that is made of a material that is different than a material of said at least two pieces of fabric and wherein the material of said piping has a higher reflectivity than the material of said at least two pieces of fabric.

4. The leash assembly as set forth in claim 1 further including at least one band that is made of an elastic material and that extends between said first and second side portions of said cover to further retain said cover on said leash mechanism.

5. The leash assembly as set forth in claim 1 wherein said at least one strap includes a hoop and hook attachment means.

6. The leash assembly as set forth in claim 1 wherein said cover further includes an elastic band which extends between said first and second side portions of said cover and which underlies said bottom of said cover and wherein a flashlight is trapped between said bottom of said cover and said elastic band.

\* \* \* \* \*